United States Patent Office 3,400,238
Patented Sept. 3, 1968

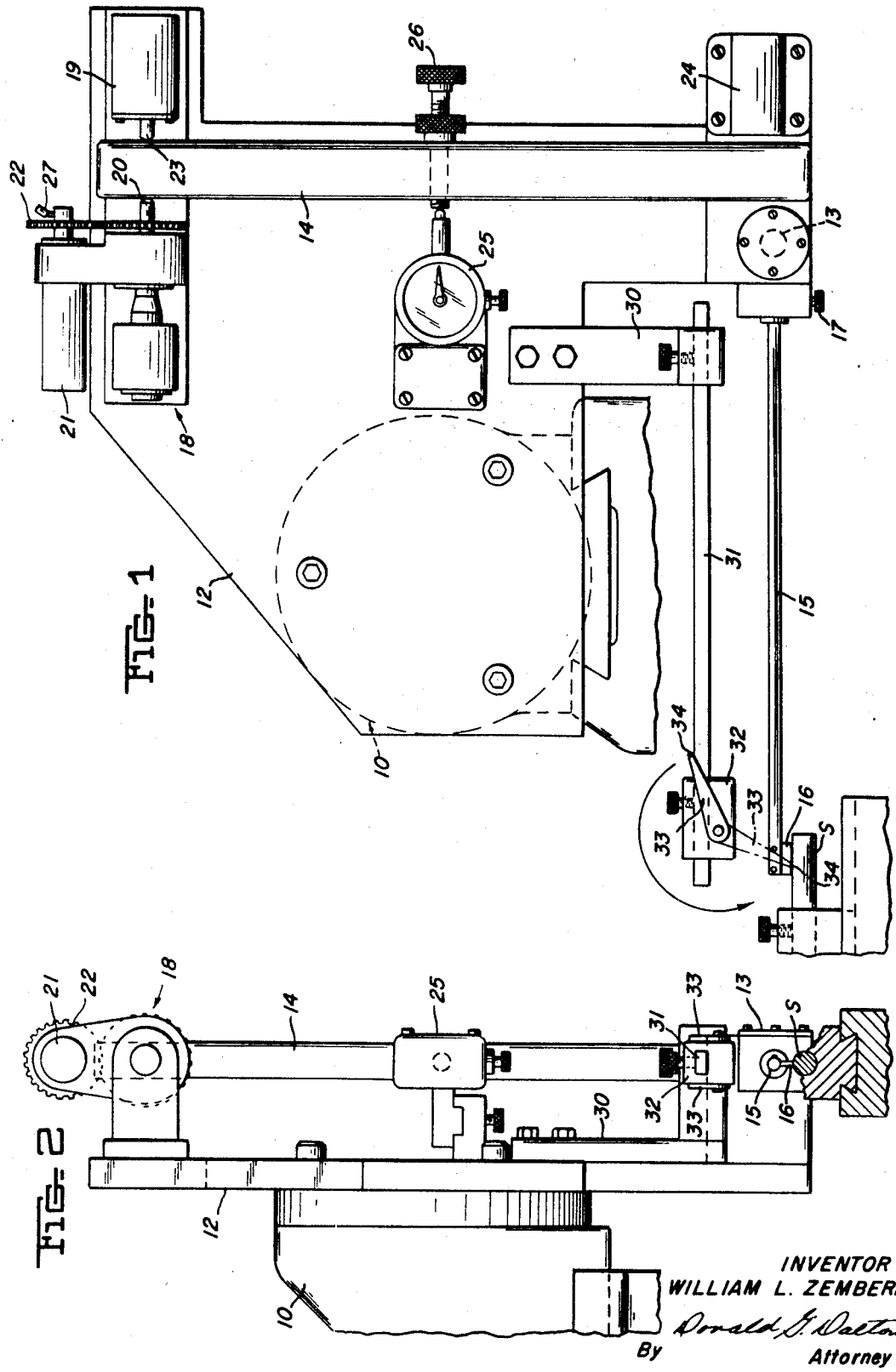

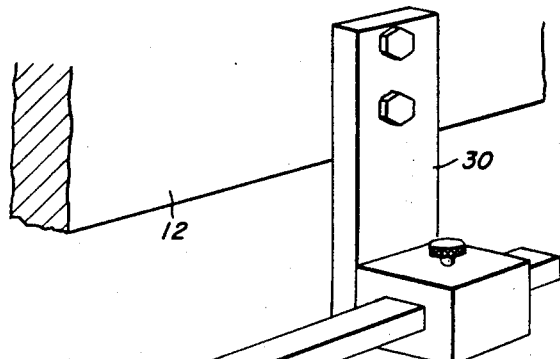
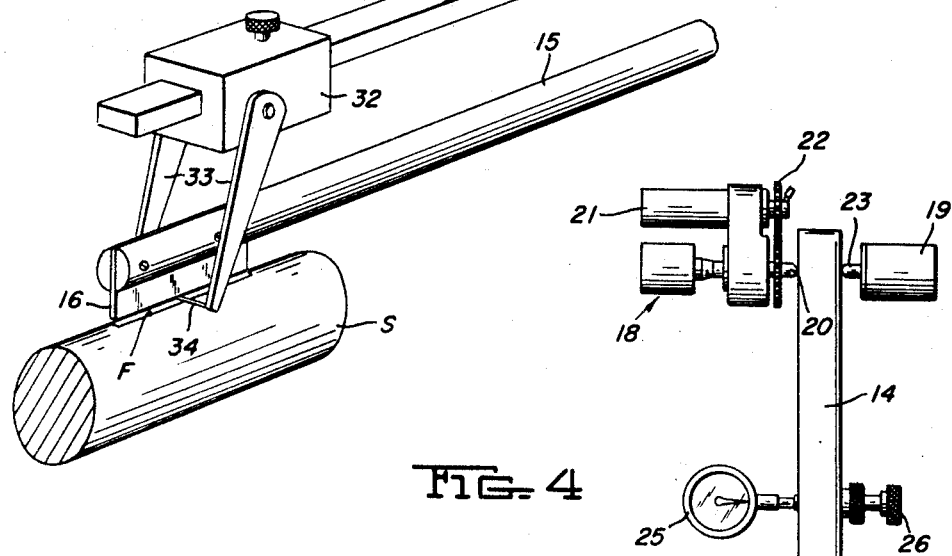
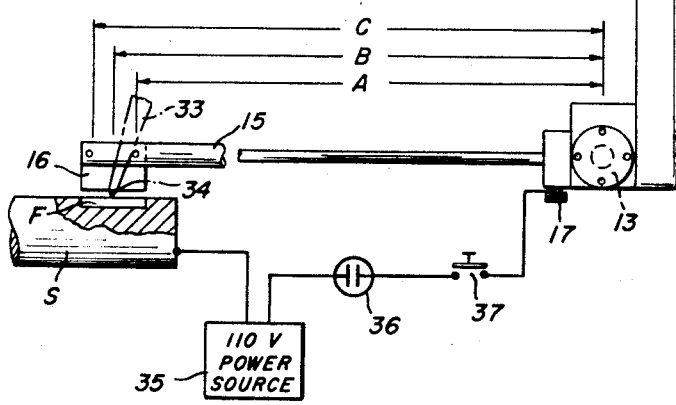

3,400,238
METHOD AND DEVICE FOR MEASURING SIMULATED FLAWS IN STANDARD SPECIMENS
William L. Zemberry, Swissvale, Pa., assignor to United States Steel Corporation, a corporation of Delaware
Filed May 14, 1965, Ser. No. 455,858
6 Claims. (Cl. 219—69)

ABSTRACT OF THE DISCLOSURE

A method and apparatus for measuring the depth of a simulated flaw cut in a metal body to be used as a standard in calibrating flaw-detection equipment. Invention is used with a known machine which includes a thin metal electrode, which penetrates the body to cut the flaw, and means to indicate the distance the electrode travels. Invention includes a gauge wire placed over the flaw when the electrode is withdrawn. Electrode then moved into contact with gauge wire. Depth of cut equals difference between micrometer readings when electrode is at bottom of flaw and when contacting gauge wire, minus diameter of wire.

---

This invention relates to an improved method and device for measuring simulated flaws in standard specimens used in flaw detection work.

Certain types of metal products are inspected for internal discontinuities by ultrasonic, eddy-current, fringe-flux or analogous system. Before actually inspecting the product, the inspector must adjust the test equipment to the desired sensitivity, using standard specimens which contain simulated flaws of known dimensions. Machines are available commercially for cutting extremely thin shallow simulated flaws in specimens to be used as standards. As hereinafter illustrated, the machine is equipped with a micrometer which measures the distance the cutting means travels in penetrating the specimen, but this measurement alone is not a direct indication of the flaw depth. Physical measurement without destroying the specimen is impractical because of the extremely narrow width of the simulated flaw. Heretofore the operator has had to cut a simulated flaw to approximately the desired depth, section the specimen through the flaw (thereby destroying the specimen), and measure the flaw depth under a microscope. After several trials the operator learned the distance of travel required for cutting flaws of different depths in the particular metal with which he was working. This practice is unduly time-consuming and costly and must be repeated for metals of each different composition or grain structure of which specimens are needed. It is not altogether accurate for the reason that specimens nominally having the same characteristics actually vary within limits.

An object of the present invention is to provide an improved method and device which measure the depth of a simulated flaw quickly and accurately without destroying specimens.

A further object is to provide a measuring device which can be installed on conventional flaw-cutting machines for indicating the flaw depth and which can be used repeatedly during the progress of a cut.

A more specific object is to provide a measuring device which indicates accurately the distance the cutting means travels from the bottom of a cut to the surface of the specimen as it is withdrawn from the cut, and which accurately locates the position of the cutting means with respect to the surface.

In the drawings:

FIGURE 1 is a front elevational view of a flaw-cutting machine equipped with my measuring device;

FIGURE 2 is an end elevational view of the machine from the left as viewed in FIGURE 1;

FIGURE 3 is a perspective view of a portion of the machine showing the measuring device in more detail; and FIGURE 4 is a diagrammatic side elevation illustrating the operation of the measuring device, a part of the figure being on a larger scale than the rest.

FIGURES 1 and 2 show a conventional flaw-cutting machine which includes a support 10, a vertical face plate 12 bolted to the support, a bearing 13 fixed to the plate near its lower right corner, and a feed arm 14 of inverted T-shaped pivoted near its lower end to the bearing. An electrode arm 15 is rigidly fixed to the lower end of the feed arm and extends approximately at a right angle thereto, and is electrically insulated therefrom. The end of the electrode arm carries a thin electrode shim 16, commonly of brass or tantalum. The feed arm carries a terminal 17 for a power input lead to the electrode arm. The upper portion of the face plate carries a feed screw mechanism 18 and a spring feed mechanism 19 at opposite sides of the feed arm 14. The feed screw mechanism 18 includes a screw 20 which engages the feed arm, a drive motor 21, and a pair of gears 22 connecting the motor and screw. The spring feed mechanism 19 includes a spring-pressed plunger 23, which engages the feed arm opposite the screw 20. The lower end of the feed arm also carries a vibrator motor 24. A dial micrometer 25 is fixed to the face plate 12 and connected to the feed arm 14 through an adjustment screw 26.

In operation, a specimen S is rigidly mounted beneath the electrode shim 16. Motor 21 is operated in a direction to back the feed screw 20 away from the feed arm 14. The spring-pressed plunger 23 pushes the feed arm to the left as the feed screw backs away, and thus turns the armr counterclockwise about its pivot in bearing 13. This action lowers the electrode shim 16 with respect to the specimen S. Electric current is supplied to the shim through the terminal 17 and electrode arm 15 to produce an arc between the shim and specimen. The vibrator motor 24 is operated to vibrate the electrode shim about 0.0002 inch up and down and prevent a dead short between the shim and specimen. A stream of dielectric oil is directed on to the shim to flush out cuttings and keep the area cool. In this manner the shim cuts a thin simulated flaw in the specimen a few thousandths of an inch in width and about 0.004 to 0.250 inch in depth. At the conclusion gears 22 are operated by hand to advance the feed screw 20 and turn the feed arm 14 clockwise to withdraw the shim from the flaw. The upper gear has a disconnect screw 27 to enable the gears to be turned independently of the drive motor 21.

At the start of a cut the dial micrometer 25 is set to zero, whereby the micrometer reading shows the distance the electrode travels in cutting the flaw. The micrometer is closer than the shim to the pivot of the feed arm, but the micrometer scale can be calibrated to furnish a direct reading. However, this reading is not a measure of the flaw depth, since the arc also burns away material from the shim. The distance the shim moves as it is withdrawn from the bottom of the flaw to the surface of the specimen is an approximate measure of the flaw depth, but is difficult to read because of the uncertainty in determining the point at which the shim is exactly even with the surface.

In accordance with my invention, I attach a depending bracket 30 to the face plate 12 and a horizontal guide bar 31 to the lower end of the bracket. The guide bar is located directly above the electrode arm 15 and extends approximately parallel thereto. Preferably it is rectangular in cross section, as best shown in FIGURE 3. I mount a gauge block 32 on the guide bar for sliding movement along the length thereof. I pivot an opposed pair of arms 33 of insulation material to the sides of the gauge block. A round wire 34 of known diameter (for example 0.0300 inch) extends between the lower ends of arms 33. As FIGURE 4 shows, I connect a power source 35, an indicator light 36, and a push-button switch 37 between the specimen S and the terminal 17 of the electrode arm 15. Preferably the indicator light 36 is of the neon-tube type which is energized as soon as a circuit is completed therethrough even though the contacting parts barely touch. The power source 35 can be a set of standard 110-volt lines.

In operation, I move the gauge block 32 along the guide bar 31 to a position in which it is out of the way of the shim 16. I use the machine in the manner already described to cut a simulated flaw F in the specimen. Before the flaw reaches its full depth, I deenergize the arc current, take note of the reading on the micrometer 25, and withdraw the shim from the cut. I move the gauge block 32 to a position in which wire 34 overlies flaw F. I lower the shim until it makes initial contact with the wire, as indicated by the light 36 coming on. I again take note of the micrometer reading. I then compute the flaw depth from the two readings, minus the wire thickness. I repeat the process, checking the depth as I cut, until the flaw reaches the desired depth. Preferably I take measurements at different locations along the flaw length, as indicated at A, B and C in FIGURE 4.

From the foregoing description it is seen that my invention affords a simple and accurate method and device for measuring the depth of simulated flaws cut in standard specimens, without destroying the specimen. The device is readily installed on existing machines which cut simulated flaws without otherwise altering the structure, and its use greatly expedites the operation.

While I have shown and described only a single embodiment of my invention, it is apparent that modifications may arise. Therefore, I do not wish to be limited to the disclosure set forth but only by the scope of the appended claims.

I claim:

1. In an operation in which an electrode shim penetrates the surface of a specimen and thereby cuts a simulated flaw in the specimen to be used as a standard, and the position of the shim is measured when contacting the bottom of the simulated flaw, the combination therewith of a method of measuring the approximate depth of the simulated flaw comprising withdrawing the shim from the simulated flaw, placing a body of a known thickness between the shim and specimen over the simulated flaw, moving the shim into contact with said body, measuring the position of the shim when contacting said body, comparing the measurements obtained when the shim is in the two positions, and deducting the thickness of said body.

2. In a machine for cutting a simulated flaw in a specimen to be used as a standard, which machine includes movable electrode means for penetrating the specimen to make a cut, and means for measuring the distance said electrode means travels, the combination therewith of a device for measuring the approximate depth of the cut comprising a body of known thickness adapted to be placed between said electrode means and the surface of the specimen over the cut, means mounting said body on said machine, and means for indicating the point of initial contact between said electrode means and said body when said electrode means is moved toward the body, whereby the measurement of the position of said electrode means while contacting said body can be compared with the distance said electrode means traveled in withdrawing from the cut.

3. A combination as defined in claim 2 in which said indicating means includes a neon tube and a power source connected to the specimen and to said electrode means, said body being electrically conductive.

4. In a machine for cutting a simulated flaw in a specimen to be used as a standard, which machine includes a face plate, means supporting said plate in an upright position, a feed arm pivoted near its lower end to said plate, an electrode arm fixed to the lower end of said feed arm and extending approximately at a right angle thereto, an electrode shim carried by said electrode arm, means for supplying arc current to said shim, feeding means for turning said feed arm about its pivot and thereby moving said shim downwardly or upwardly, said shim being adapted to make a cut in a specimen as it travels downwardly, and means mounted on said plate and operatively connected with said feed arm for measuring the distance said shim travels, the combination therewith of a device for measuring the approximate depth of the cut comprising a body of known thickness, means mounted on said plate and supporting said body for movement between a position in which it can be placed between said shim and the surface of a specimen over the cut and a position in which it is out of the way of said shim, and means for indicating the point of initial contact between said shim and said body when said shim is moved downwardly toward the body in its first-named position, whereby the measurement of the position of said shim while contacting said body can be compared with the distance said shim traveled in withdrawing from the cut.

5. A combination as defined in claim 4 in which the means supporting said body includes a depending bracket fixed to said plate, a gauge rod fixed to the lower end of said bracket above said electrode arm, a gauge block mounted for sliding movement on said gauge arm, and a pair of arms of insulation material pivoted to said block, said body being in the form of a wire which extends between said last-named arms.

6. A combination as defined in claim 4 in which said indicating means includes a neon tube and a power source connected to the specimen and to said shim, said body being electrically conductive.

References Cited

UNITED STATES PATENTS

| | | | |
|---|---|---|---|
| 3,247,599 | 4/1966 | O'Connor | 219—69 X |
| 3,349,495 | 10/1967 | Zemberry | 219—69 X |

FOREIGN PATENTS

| | | |
|---|---|---|
| 880,983 | 10/1961 | Great Britain. |

RICHARD M. WOOD, *Primary Examiner.*

R. F. STAUBLY, *Assistant Examiner.*